United States Patent

Kato

[11] Patent Number: 6,152,485
[45] Date of Patent: Nov. 28, 2000

[54] HEAD-PROTECTING AIR BAG DEVICE FOR A VEHICLE

[75] Inventor: Makoto Kato, Toyota, Japan

[73] Assignee: Toyota Jidosha Kabushiki Kaisha, Toyota, Japan

[21] Appl. No.: 09/270,058

[22] Filed: Mar. 16, 1999

[30] Foreign Application Priority Data

Mar. 18, 1998 [JP] Japan .................................. 10-068218

[51] Int. Cl.⁷ .................................................... B60R 21/06
[52] U.S. Cl. ................... 280/749; 280/728.2; 280/730.1; 280/730.2
[58] Field of Search ................................ 280/749, 730.2, 280/730.1, 728.2, 748, 728.1

[56] References Cited

U.S. PATENT DOCUMENTS

| 5,462,308 | 10/1995 | Seki et al. ................................ 280/749 |
| 5,791,683 | 8/1998 | Shibata et al. ......................... 280/730.1 |
| 5,899,491 | 5/1999 | Tschaeschke ......................... 280/730.1 |
| 5,924,722 | 7/1999 | Koide et al. .......................... 280/730.2 |

FOREIGN PATENT DOCUMENTS

96/26087  8/1996  WIPO .

*Primary Examiner*—Brian L. Johnson
*Assistant Examiner*—Matthew Luby
*Attorney, Agent, or Firm*—Pillsbury Madison & Sutro LLP

[57] ABSTRACT

A pillar garnish is formed by a pillar garnish main body portion which forms a portion of a front pillar at the interior of a vehicle, and a pillar garnish divided portion separated from the pillar garnish main body portion and forming a portion of a division bar at the interior of a vehicle. The pillar garnish divided portion includes an extending portion which extends along an upper edge of a fixed window. A guide surface for guiding the expansion of the air bag body is formed at an upper edge of the extending portion along a direction in which the front pillar extends. During the expansion of the air bag body, only the pillar garnish main body portion opens along the guide surface and the pillar garnish divided portion remains unmoved.

20 Claims, 10 Drawing Sheets

HEAD-PROTECTING AIR BAG DEVICE FOR A VEHICLE

BACKGROUND OF THE INVENTION

1. Field of the Invention

The present invention relates to a head-protecting air bag device for a vehicle, wherein a head-protecting air bag body accommodated along a pillar and a roof side rail unfolds similarly to a curtain due to gas jetted from an inflator when a high load of predetermined level acts on a side portion of a vehicle body.

2. Description of the Related Art

There has been proposed a head-protecting air bag device for a vehicle in which, in order to improve the ability to protect the head of a vehicle occupant seated in a front seat when a predetermined high load acts on a side portion of a vehicle body, a head-protecting air bag body accommodated in a folded state over a region from a front pillar to a roof side rail is caused to unfold along a side window glass similarly to a curtain. This type of head-protecting air bag device for a vehicle is disclosed in International Publication No. WO 96/26087 and will be described hereinafter.

Figure 9:
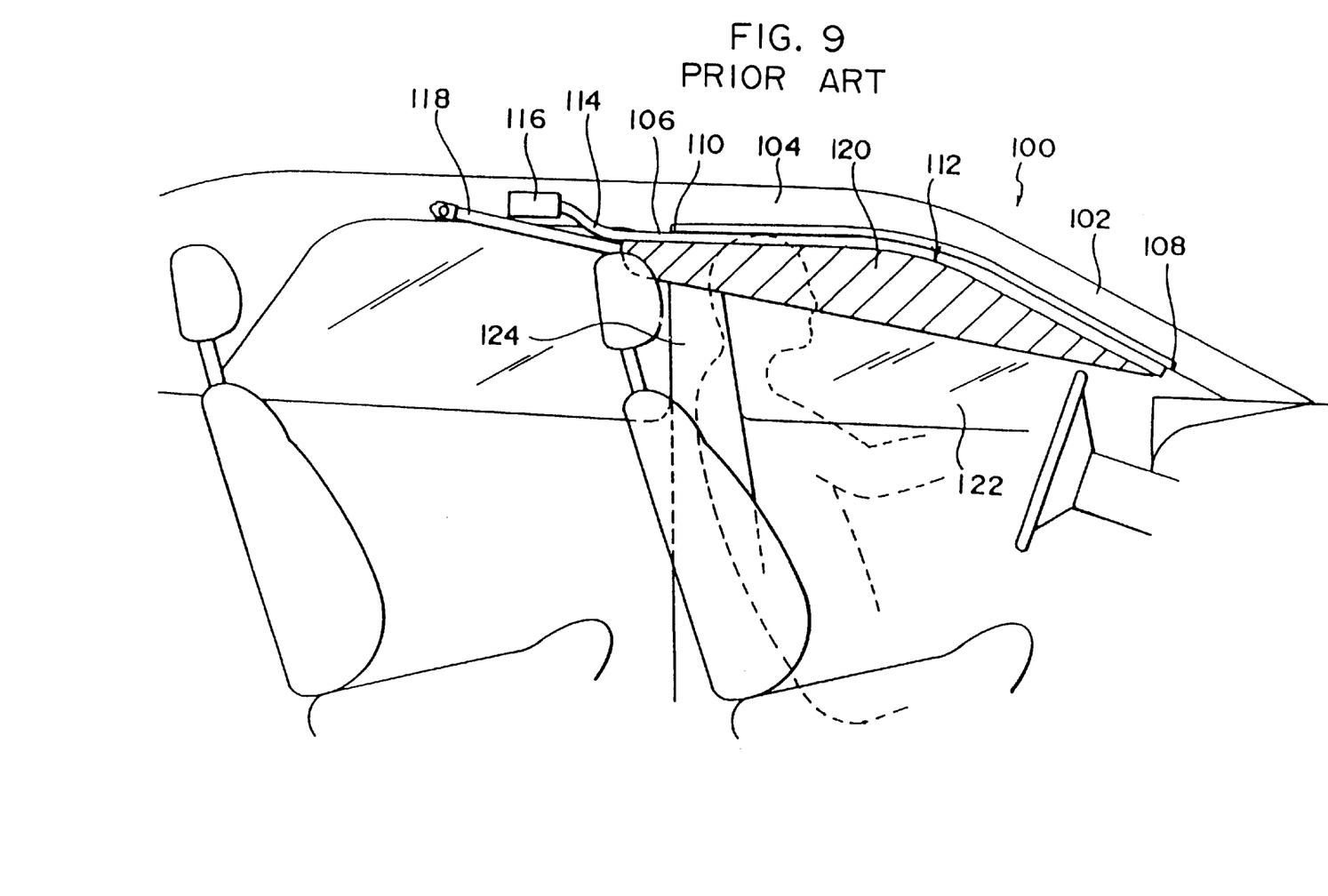
FIG. 9 is a side view which schematically shows the state in which expansion of an air bag body in a conventional head-protecting air bag device for a vehicle has been completed.

As shown in FIG. 9, a head-protecting air bag device 100 for a vehicle is structured to include, as main components, an elongated duct 106 disposed to extend from a front pillar portion 102 to a roof side rail portion 104, an air bag body 112 accommodated in the duct 106 in a folded state and fixed to a vehicle body at a front-end fixed point 108 and at a rear-end fixed point 110, an inflator 116, which is connected via a hose 114 to the rear end of the duct 106 and jets out gas when a predetermined high load acts on the side portion of the vehicle body, and a band-shaped strap 118 whose one end is fixed to the vehicle body and whose other end is fixed to the rear end of the air bag body 112. The air bag body 112 is formed by connecting a plurality of cells 120 together, which cells are each formed substantially into a cylindrical shape and are disposed with the longitudinal directions thereof substantially coinciding with the vertical direction of the vehicle.

According to the above-described structure, when a predetermined high load acts on the side portion of the vehicle body, gas is jetted from the inflator 116. The jetted gas flows into each cell 120 of the folded air bag body 112 via the hose 114 and the duct 106. As a result, each cell 120 expands substantially into a cylindrical configuration with the longitudinal direction thereof substantially coinciding with the vertical direction of the vehicle. The air bag body 112 is thereby inflated similarly to a curtain along a window glass 122. Further, the rear end of the air bag body 112 is connected via the strap 118 to the vehicle body, and therefore, the rear-end side of the air bag body 112 is reliably disposed at an inner side of the upper portion of a center pillar portion 124.

However, if the head-protecting air bag device as described above is used in a vehicle in which a triangular fixed window is provided in a front portion of a window glass of a front side door, a trim of a division bar formed in a rear edge portion of the fixed window is formed integrally with a front pillar garnish and it is thereby difficult for the entire front pillar garnish including the trim of the division bar to be sufficiently opened during the expansion of the air bag body.

SUMMARY OF THE INVENTION

In view of the above-described facts, it is an object of the present invention to provide a head-protecting air bag device for a vehicle which can reliably inflate to unfold a head-protecting air bag body even in a vehicle in which a triangular corner portion is provided on at least one of the front side of a window glass of a front side door and the rear side of a window glass of a rear side door.

In order to achieve the above-described object, the present invention has the following aspects.

In a first aspect of the present invention, a head-protecting air bag device for a vehicle in which an air bag body is accommodated in a folded state over a region from a pillar to a roof side rail such that the air bag body can expand similarly to a curtain upon a collision and a portion of the pillar at the interior of the vehicle is formed by a pillar garnish, comprises: a triangular corner portion formed in at least one of the front portion of a window glass of a front side door and the rear portion of a window glass of a rear side door; a pillar garnish main body portion which forms a portion of the pillar at the interior of the vehicle and is allowed to open during expansion of the air bag body; and a pillar garnish divided portion which is formed separately from said pillar garnish main body portion and forms a portion of said triangular corner portion at the interior of the vehicle in at least a region along an edge portion of a window glass, said pillar garnish divided portion being fixed to the pillar.

Accordingly, during the expansion of the air bag body, only the pillar garnish main body portion opens, and therefore, there is no possibility of the pillar garnish divided portion preventing expansion of the head-protecting air bag body. As a result, even in the vehicle in which the triangular corner portion is provided in at least one of the front side of the window glass of the front side door and the rear side of the window glass of the rear side door, the head-protecting air bag body can be reliably inflated to unfold.

Further, during the expansion of the air bag body, the pillar garnish divided portion formed separately from the pillar garnish main body portion and fixed to the pillar is disposed unmoved at a vehicle-exterior side of the expanded head-protecting air bag body. Due to this structure, the pillar garnish divided portion improves the effect achieved by the head-protecting air bag body of restraining movement of the head of a vehicle occupant toward the exterior side of a vehicle.

In a second aspect of the present invention, the pillar garnish divided portion includes an extending portion which extends along an upper edge of the triangular corner portion and the extending portion includes fixing portions and is fixed by the fixing portions to the pillar, the fixing portions being covered by the pillar garnish main body portion.

Accordingly, in addition to the effects obtained by the above-described first aspect, the pillar garnish divided portion can be fixed to the pillar without impairing the appearance of the portion where the pillar garnish main body portion and the pillar garnish divided portion are connected. Further, the assembling efficiency of each of the pillar garnish main body portion and the pillar garnish divided portion is improved by employing the separated structure of the pillar garnish main body portion and the pillar garnish divided portion rather than employing a complicated combined structure.

In a third aspect of the present invention, a guide surface for guiding an expansion of the air bag body is formed in the extending portion provided based on the above-described second aspect.

Accordingly, in addition to the effects obtained by the above-described second aspect, during the expansion of the air bag body, the head-protecting air bag body can be smoothly expanded in a predetermined direction along the guide surface formed in the pillar garnish divided portion, and therefore, the head-protecting air bag body expands promptly into the interior of a vehicle.

DETAILED DESCRIPTION OF THE PREFERRED EMBODIMENTS

A description will be hereinafter given of a head-protecting air bag device for a vehicle according to a first embodiment of the present invention with reference to FIGS. 1 to 5.

It should be noted that arrows "FR", "UP", and "IN" shown in the accompanying drawings, respectively represent the forward direction of a vehicle, the upward direction of the vehicle, and the inward direction thereof relative to the transverse axis of the vehicle.

Figure 5:
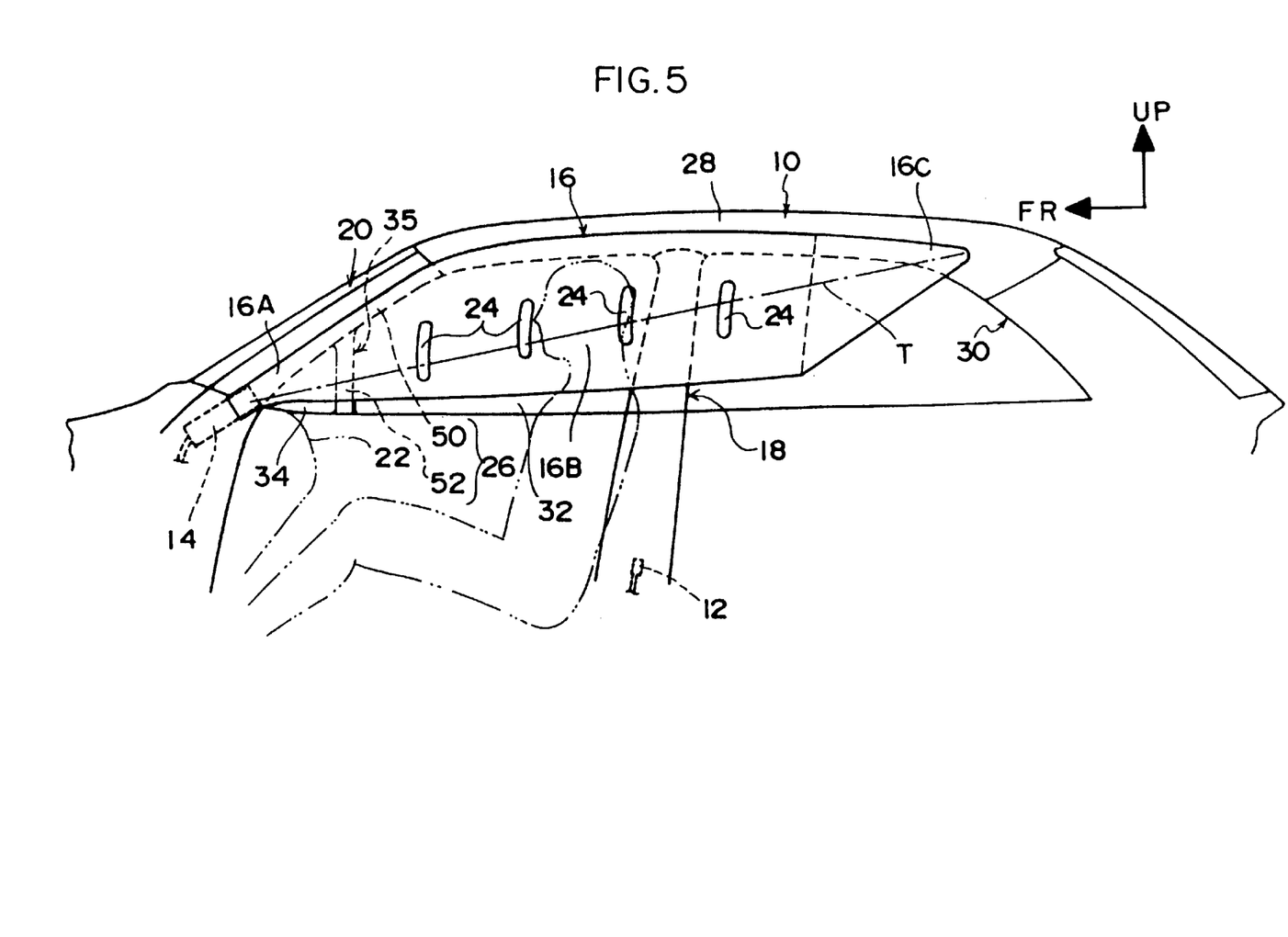
FIG. 5 is a side view which schematically shows a state in which the air bag body shown in FIG. 4 has expanded.

As shown in FIG. 5, a head-protecting air bag device 10 for a vehicle according to the present embodiment is structured to include a sensor 12 for detecting the state where a side collision has occurred in a vehicle, a cylindrical inflator 14 which operates to eject gas, and an air bag body 16. The sensor 12 is disposed in the vicinity of the lower end of a center pillar (B pillar) 18, and when a side-collision load of a predetermined value or greater acts on a side portion of a vehicle body, the sensor 12 is provided to detect the state where a side collision has occurred.

The inflator 14 is disposed near a portion where a front pillar (A pillar) 20 and an instrument panel 22 are connected, and is connected to the above-described sensor 12. Accordingly, when the state where a side collision has occurred is detected by the sensor 12, the inflator 14 is made to operate.

A plurality of non-expanding portions 24 whose longitudinal direction coincides with the vertical direction of the air bag body seen from a side view are formed at intermediate portions of the air bag body 16 in the vertical direction and in series along the longitudinal direction of the air bag body 16 at a predetermined interval therebetween in such a manner as to cross a tension line T which connects a front-side fixed point and a rear-side fixed point of the air bag body 16. These non-expanding portions 24 allows formation of a plurality of cylindrical expanding portions disposed substantially in parallel and provided so as to cross the tension line T during expansion of the air bag body.

The front end 16A of the air bag body 16 is disposed at a position where the inflator 14 is provided, so as to allow gas ejected from the inflator 14 to flow into the air bag body. An upper end edge of an intermediate portion 16B is disposed along the front pillar 20 and a roof side rail 28 and an upper end edge of a rear end 16C is disposed near a quarter pillar (C pillar) 30.

Figure 4:
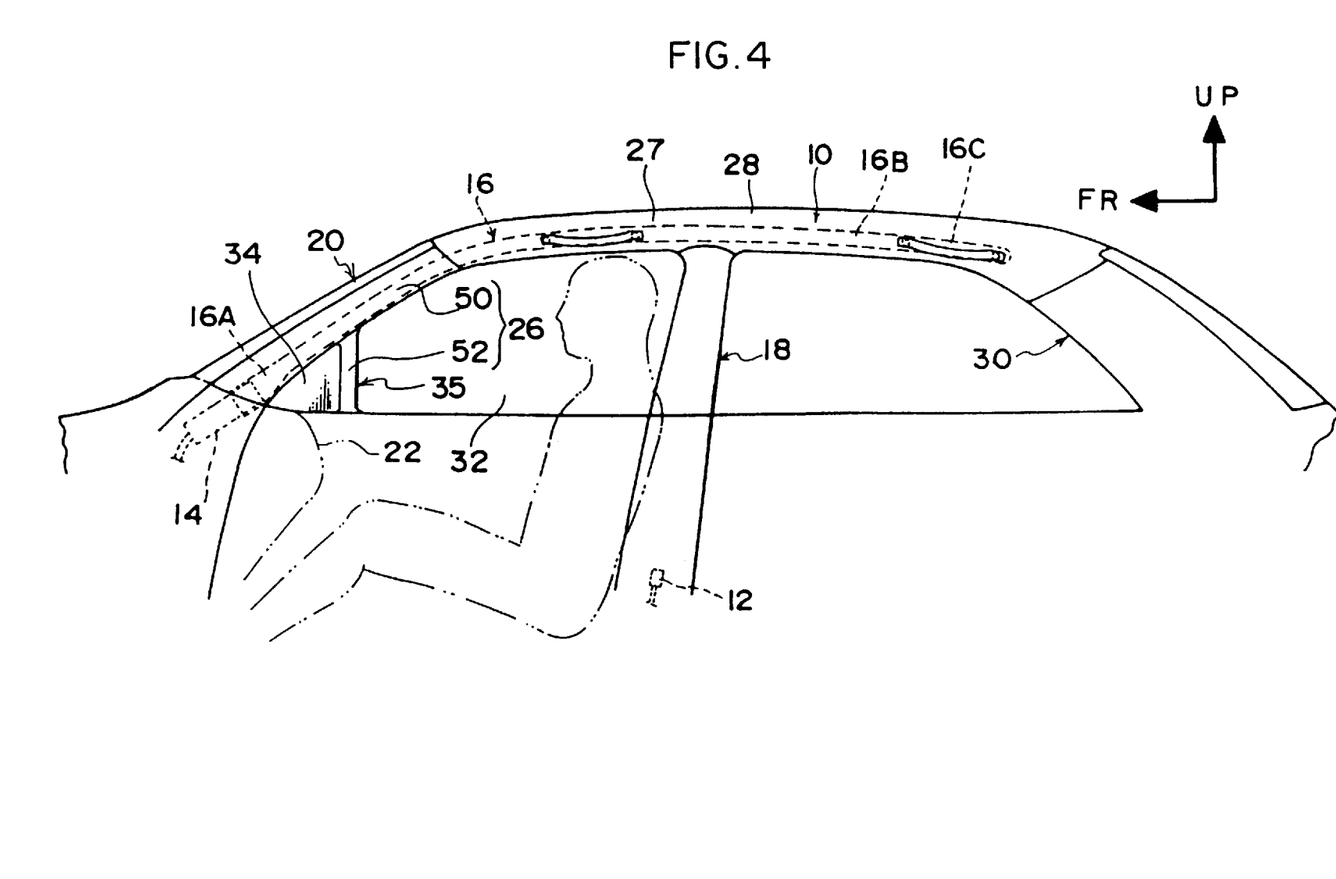
FIG. 4 is a side view which schematically shows a state in which an air bag body is accommodated in the head-protecting air bag device for a vehicle according to the first embodiment of the present invention.

As shown in FIG. 4, the air bag body 16 is accommodated over a region from a front pillar garnish 26 to a roof side rail garnish 27 or a roof head lining in such a manner as to be made elongated by being folded like a bellows substantially in the vertical direction of the vehicle.

In the present embodiment, a fixed window 34 is formed, as a triangular corner portion, at the front side of a window glass 32 of a front side door. A division bar 35 extending vertically is disposed in a window glass-side edge portion (a rear-side edge portion) of the fixed window 34.

Figure 3:
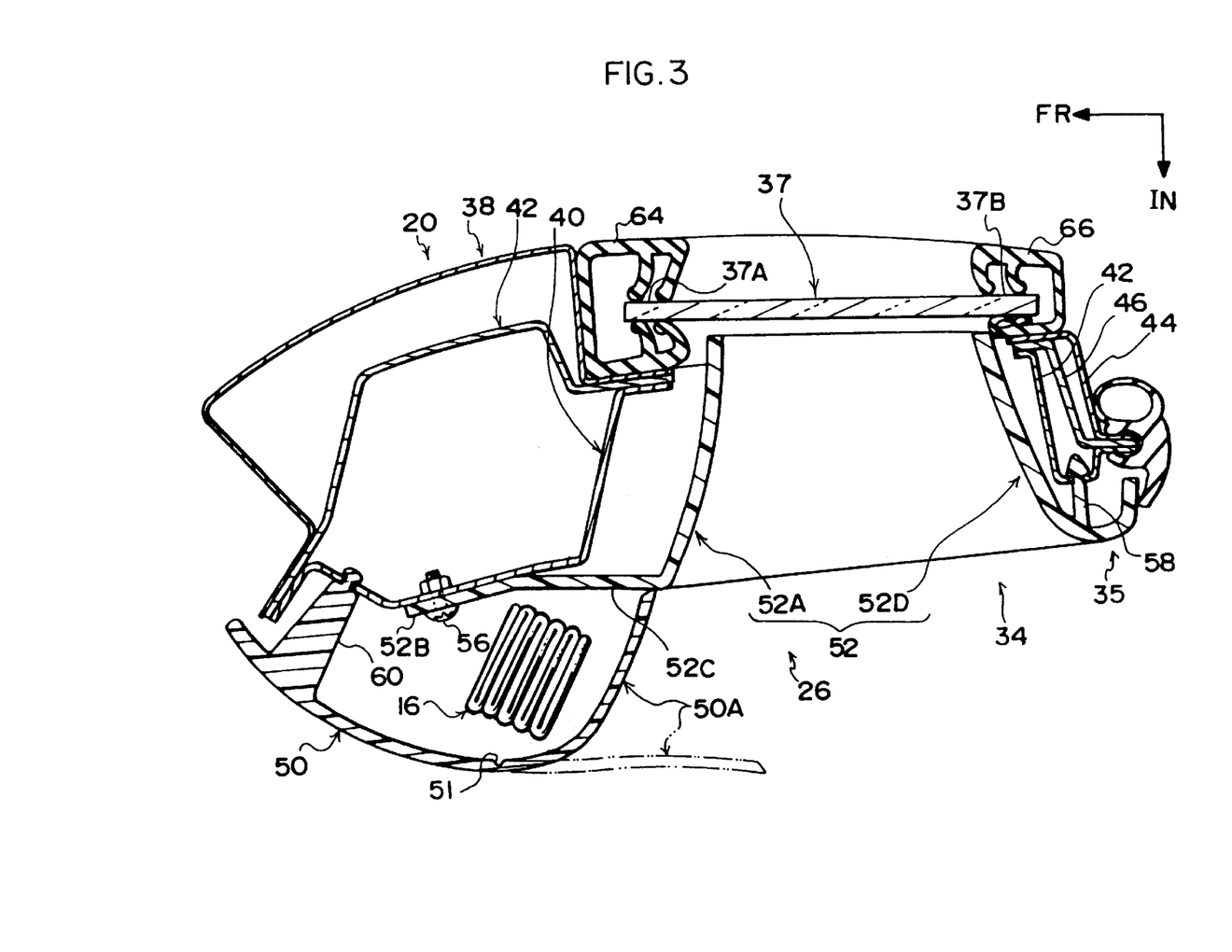
FIG. 3 is an enlarged cross sectional view taken along the line 3—3 in FIG. 1.

As shown in FIG. 3, a pillar outer panel 38 and a pillar inner panel 40 of the front pillar 20 form a closed cross sectional configuration and a pillar reinforcement 42 having a substantially hat-shaped cross sectional configuration is disposed to be held between the pillar outer panel 38 and the pillar inner panel 40.

Further, a division bar inner panel 42 and a division bar outer panel 44 of the division bar 35 form a closed cross sectional structure and a division bar reinforcement 46 is disposed so as to be held between the division bar inner panel 42 and the division bar outer panel 44.

Figure 1:
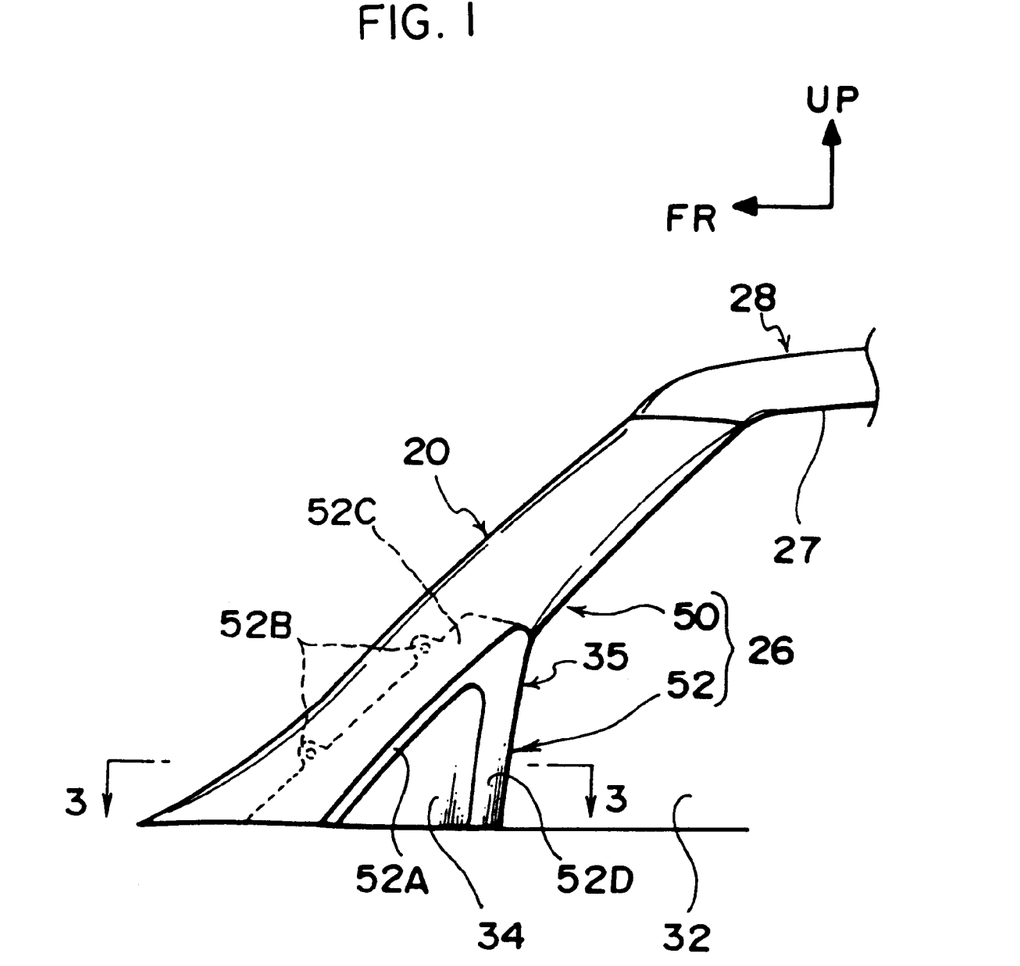
FIG. 1 is a side view seen from an inner side of a vehicle, which shows a principal portion of a head-protecting air bag device for a vehicle according to a first embodiment of the present invention.

As shown in FIG. 1, the pillar garnish 26 forms a vehicle-interior portion of the front pillar. The pillar garnish 26 is formed by a pillar garnish main body portion 50 and a pillar garnish divided portion 52 formed separately from the pillar garnish main body portion 50 and forming an edge portion of the fixed window 34 next to the window glass 32, namely, a vehicle-interior portion of the division bar 35.

Figure 2:
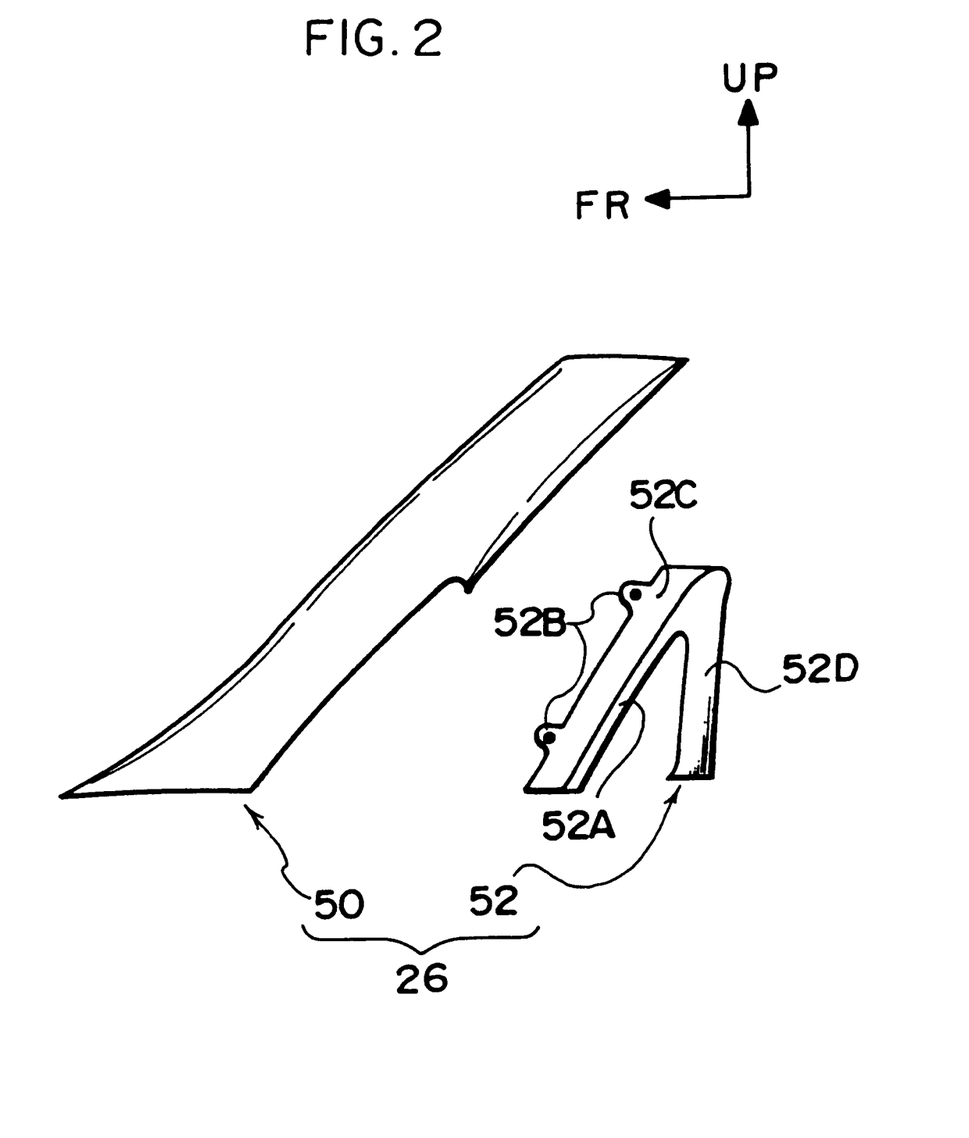
FIG. 2 is an exploded view when seen from an inner side of a vehicle, which shows the principal portion of the head-protecting air bag device for a vehicle shown in FIG. 1.

As shown in FIG. 2, the pillar garnish divided portion 52 includes an extending portion 52A which extends along an upper edge of the triangular corner portion. Further, a pair of fixing portions 52B, which are provided at upper and lower sides of the extending portion 52A of the pillar garnish divided portion 52, each project toward the front side from the extending portion 52A. A guide surface 52C for guiding an expansion of the air bag body is formed in an upper edge portion of the extending portion 52A along the direction in which the front pillar 20 extends.

As shown in FIG. 3, each of the fixing portions 52B of the pillar garnish divided portion 52 is fixed to the pillar inner panel 40 by mounting means 56 such as a screw and a nut. Further, a rear portion 52D extending downward from the rear end of the extending portion 52A of the pillar garnish divided portion 52 forms a vehicle-interior side portion of the division bar 35. A hook 58 is formed standing upright on a back surface of the rear portion 52D of the pillar garnish divided portion 52 and the rear portion 52D of the pillar garnish divided portion 52 is fixed to the division bar inner panel 42 by the hook 58.

A hook 60 is formed on a back surface of the pillar garnish main body portion 50 at the front side such that the hook 60 stands on the back surface and the front portion of the pillar garnish main body portion 50 is fixed by the hook 60 to the pillar inner panel 40. The folded air bag body 16 is accommodated between the rear portion of the pillar garnish main body portion 50 and the guide surface 52C of the pillar garnish divided portion 52. When the air bag body expands, the rear portion 50A of the pillar garnish main body portion 50 is structured so as to elastically deform so as to open due to a notch 51 formed on the back surface of the pillar garnish main body portion 50 along the longitudinal direction of the main body portion 50 as indicated by the two-dot chain line in FIG. 3.

Further, a front edge portion 37A of a fixed window glass 37 is fixed to the pillar outer panel 38 via a weather strip 64 and a rear edge portion 37B of the fixed window glass 37 is fixed to the division bar outer panel 44 via a weather strip 66.

Next, the operation of the present embodiment will be described.

In the head-protecting air bag device for a vehicle of the present embodiment, during the expansion of the air bag body, only the rear portion 50A of the pillar garnish main body portion 50 opens as indicated by the two-dot chain line in FIG. 3 and the pillar garnish divided portion 52 does not open. Because of this structure, there is no possibility of the pillar garnish divided portion 52 preventing the expansion of the air bag body 16. As a result, in the vehicle in which the fixed window 34 is provided at the front of the window glass 32 of the front side door, the air bag body 16 can be reliably inflated to unfold.

As shown in FIG. 5, during the expansion of the air bag body, the pillar garnish divided portion 52 formed separately from the pillar garnish main body portion 50 remains unmoved at a vehicle-exterior side of the expanded air bag body 16. Accordingly, the pillar garnish divided portion 52 can improve the effect achieved by the air bag body 16 of restraining movement of the head of a vehicle occupant toward the exterior of the vehicle.

Further, in the head-protecting air bag device for a vehicle of the present embodiment, the extending portion 52A of the pillar garnish divided portion 52 is fixed to the pillar inner panel 40 at the fixing portions 52B and these fixing portions 52B are covered by the pillar garnish main body portion 50. Because of this structure, the pillar garnish divided portion 52 can be fixed to the pillar inner panel 40 without impairing the appearance of the portion where the pillar garnish main body portion 50 and the pillar garnish divided portion 52 are connected. In addition, as the pillar garnish main body portion 50 and the pillar garnish divided portion 52 are formed separately, each of the pillar garnish main body portion 50 and the pillar garnish divided portion 52 can be more easily and more efficiently assembled in the manufacturing process than if they were integrally formed.

Moreover, in the head-protecting air bag device for a vehicle of the present embodiment, during the expansion of the air bag body, the air bag body 16 can be expanded smoothly in a predetermined direction along the guide surface 52C formed as the outer surface of the pillar garnish divided portion 52, and therefore, the air bag body 16 can be promptly expanded into the interior of a vehicle.

Next, a second embodiment of the head-protecting air bag device according to the present invention will be described with reference to FIGS. 6 to 8.

It should be noted that the same members as those of the first embodiment will be denoted by the same reference numerals and a description thereof will be omitted.

Figure 6:
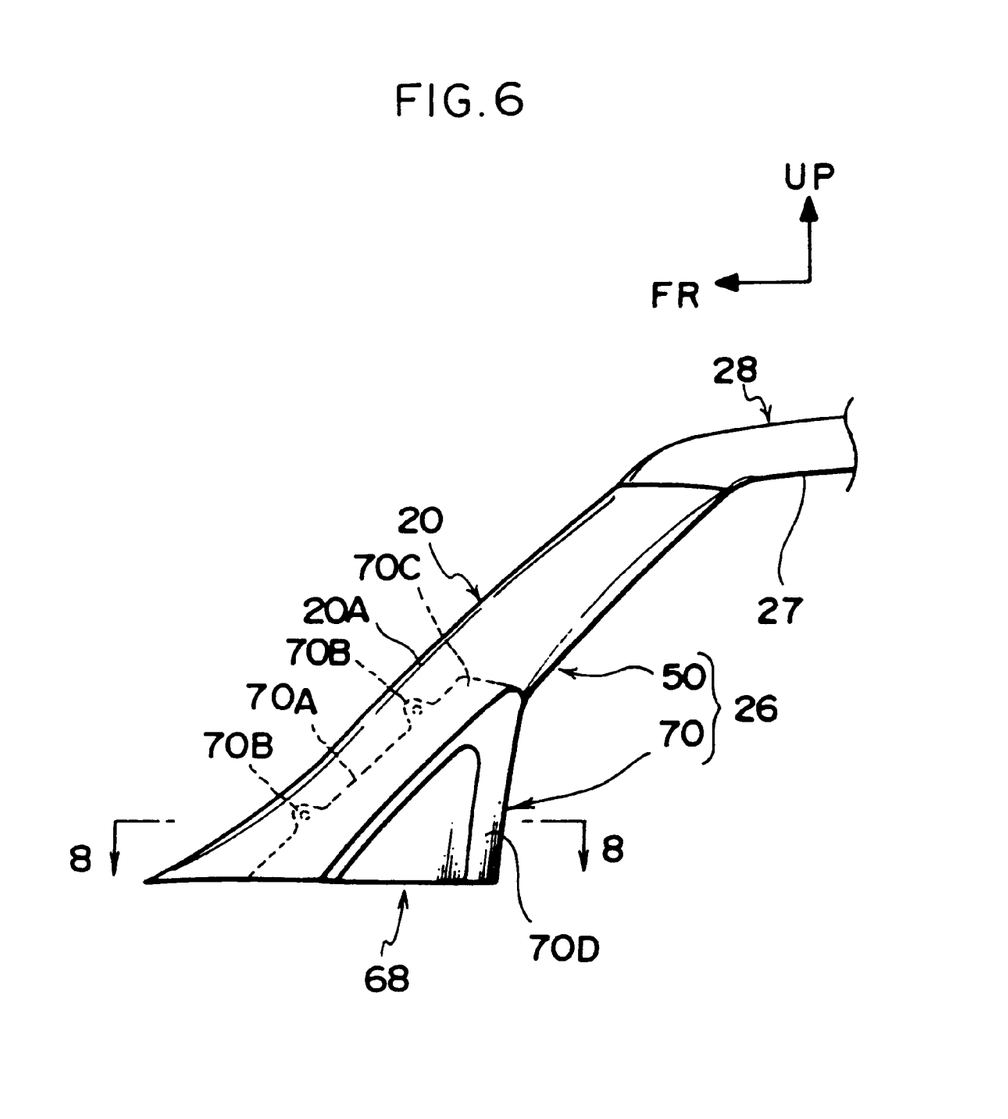
FIG. 6 is a side view seen from an inner side of a vehicle, which shows a principal portion of a head-protecting air bag device for a vehicle according to a second embodiment of the present invention.

As shown in FIG. 6, in the present embodiment, a fixed panel plate portion 68 is formed as a triangular corner portion at the front side of the window glass 32 of the front side door. The pillar garnish 26 is formed by a pillar garnish main body portion 50 and a pillar garnish divided portion 70. The pillar garnish main body portion 50 forms a portion of the front pillar at the interior of the vehicle and the pillar garnish divided portion 70 is formed separately from the pillar garnish main body portion 50 and forms a portion of the fixed plate panel portion 68 at the interior of the vehicle.

Figure 7:
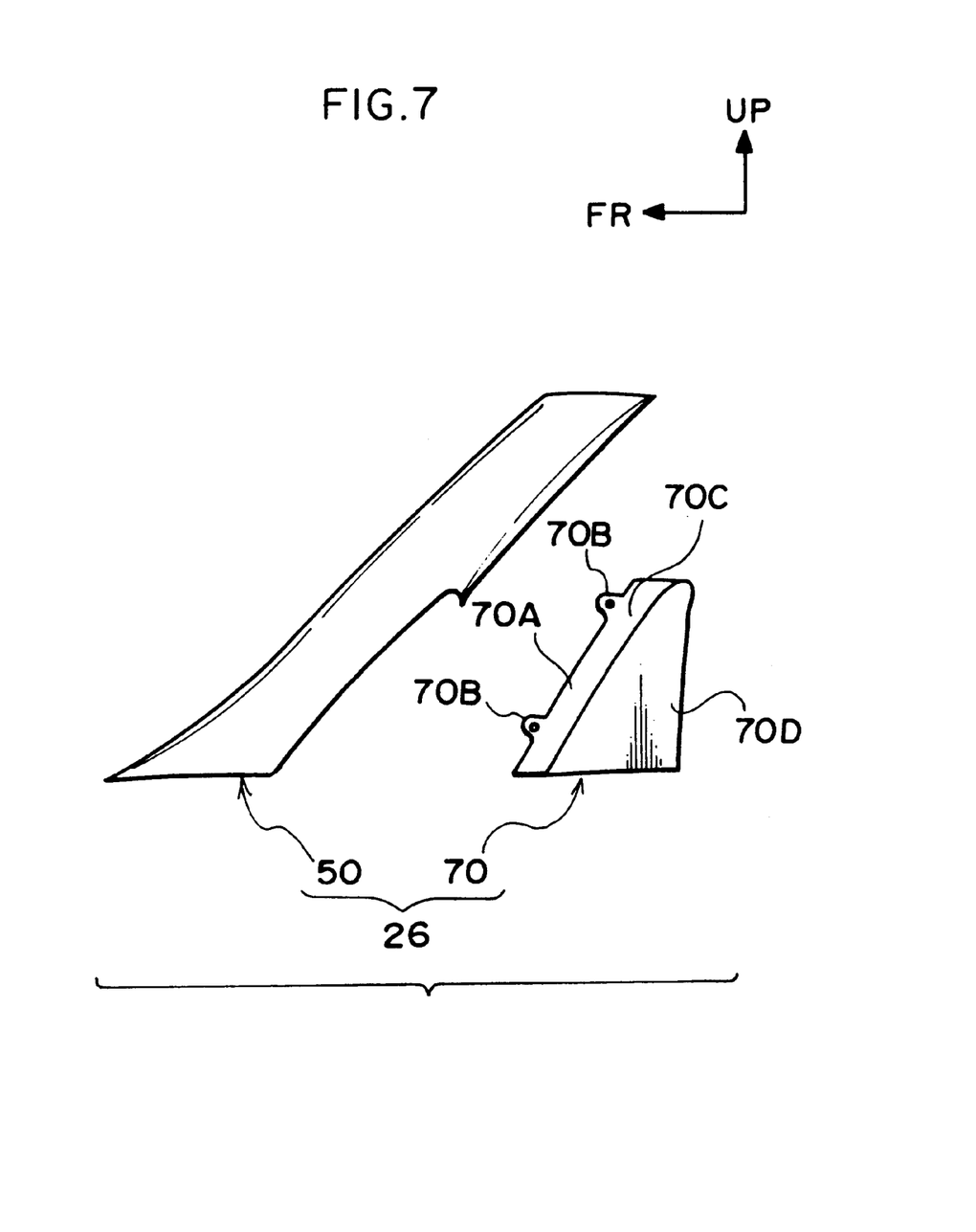
FIG. 7 is an exploded view seen from an inner side of a vehicle, which shows the principal portion of the head-protecting air bag device for a vehicle shown in FIG. 6.

As shown in FIG. 7, the pillar garnish divided portion 70 includes an extending portion 70A which extends along an upper edge of the triangular corner portion.

Figure 8:
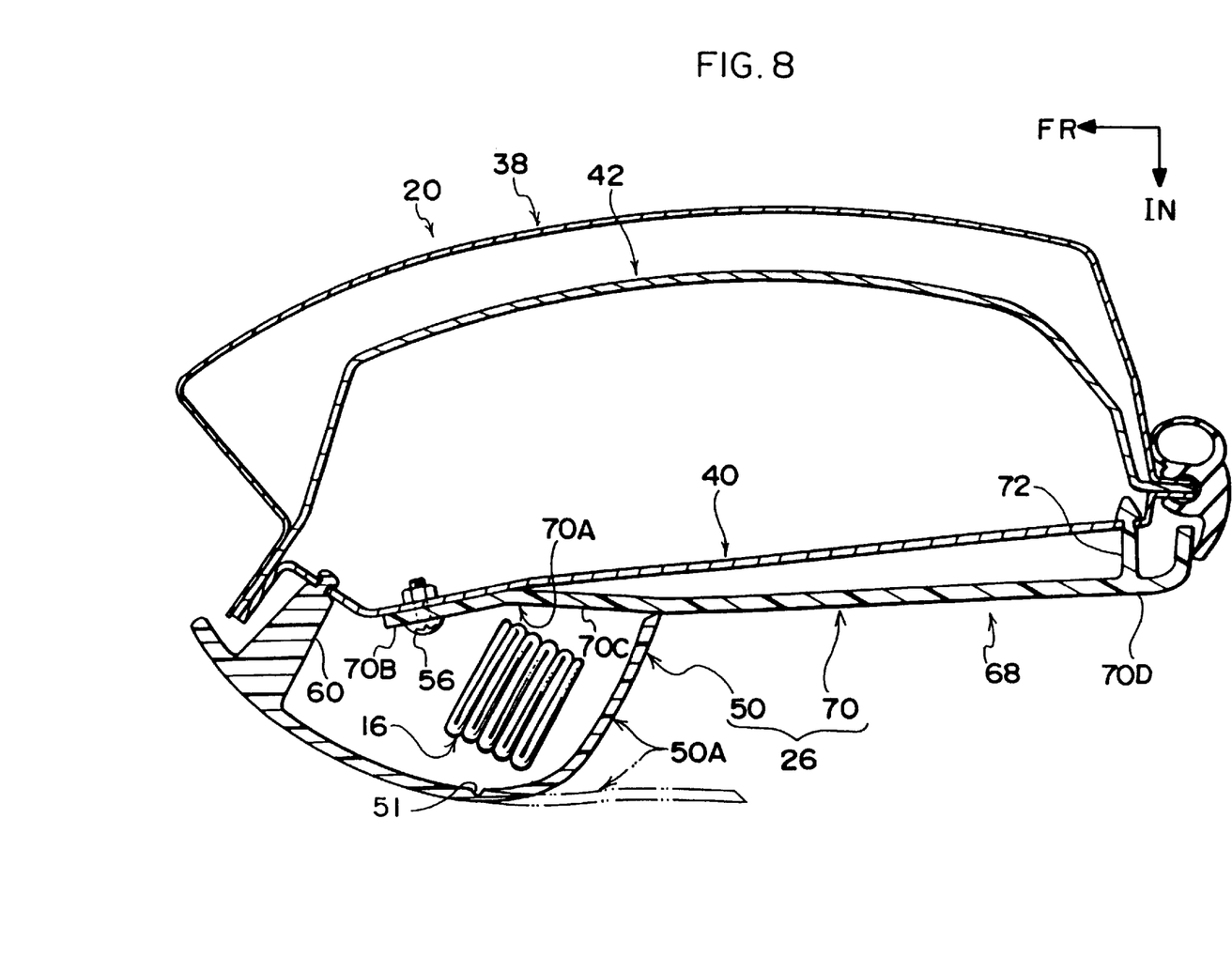
FIG. 8 is an enlarged cross sectional view taken along the line 8—8 in FIG. 6.

As shown in FIG. 8, in the fixed panel plate portion 68 of the present embodiment, the pillar outer panel 38, the pillar inner panel 40, and the pillar reinforcement 42 each extend toward the rear of the vehicle. Further, a pair of fixing portions 70B are formed at upper and lower sides of the extending portion 70A of the pillar garnish divided portion 70 in such a manner as to project toward the front from the extending portion 70A. These fixing portions 70B are each fixed to the pillar inner panel 40 by mounting means 56 such as a screw and a nut. Further, a guide surface 70C for guiding the expansion of the air bag body is formed in an upper edge portion of the extending portion 70A along the direction in which the front pillar 20 extends. A hook 72 is formed standing upright on a back surface of a rear portion 70D of the pillar garnish divided portion 70 and the rear portion 70D of the pillar garnish divided portion 70 is fixed by the hook 72 to the pillar inner panel 40.

Next, the operation of the present embodiment will be described.

In the head-protecting air bag device for a vehicle of the present embodiment, during the expansion of the air bag body, only the rear portion 50A of the pillar garnish main body portion 50 opens as indicated by the two-dot chain line in FIG. 8 and the pillar garnish divided portion 70 does not open. Because of this structure, there is no possibility of the pillar garnish divided portion 70 preventing expansion of the air bag body 16. As a result, in the vehicle in which the fixed panel plate portion 68 is provided at the front side of the window glass 32 of the front side door, the air bag body 16 can be reliably inflated to unfold.

During the expansion of the air bag body, the pillar garnish divided portion 70 formed separately from the pillar garnish main body portion 50 remains unmoved at a vehicle-exterior side of the expanded air bag body 16, and therefore, the pillar garnish divided portion 70 improves the effect achieved by the air bag body 16 of restraining movement of the head of a vehicle occupant toward the exterior of a vehicle.

Further, in the head-protecting air bag device of the present embodiment, the extending portion 70A of the pillar garnish divided portion 70 is fixed to the pillar inner panel 40 at the fixing portions 70B and these fixing portions 70B are covered by the pillar garnish main body portion 50. Accordingly, the pillar garnish divided portion 70 can be fixed to the pillar inner panel 40 without impairing the appearance of the portion where the pillar garnish main body portion 50 and the pillar garnish divided portion 70 are connected. Further, as the pillar garnish main body portion 50 and the pillar garnish divided portion 70 are formed separately, each of the pillar garnish main body portion 50 and the pillar garnish divided portion 70 can be more easily and more efficiently assembled in the manufacturing process than if they were integrally formed.

Moreover, in the head-protecting air bag device for a vehicle of the present embodiment, during the expansion of the air bag body, the air bag body 16 can be expanded smoothly in a predetermined direction along the guide surface 70C formed as the outer surface of the pillar garnish divided portion 70. As a result, the air bag body 16 can be expanded rapidly into the interior of a vehicle.

Figure 10:
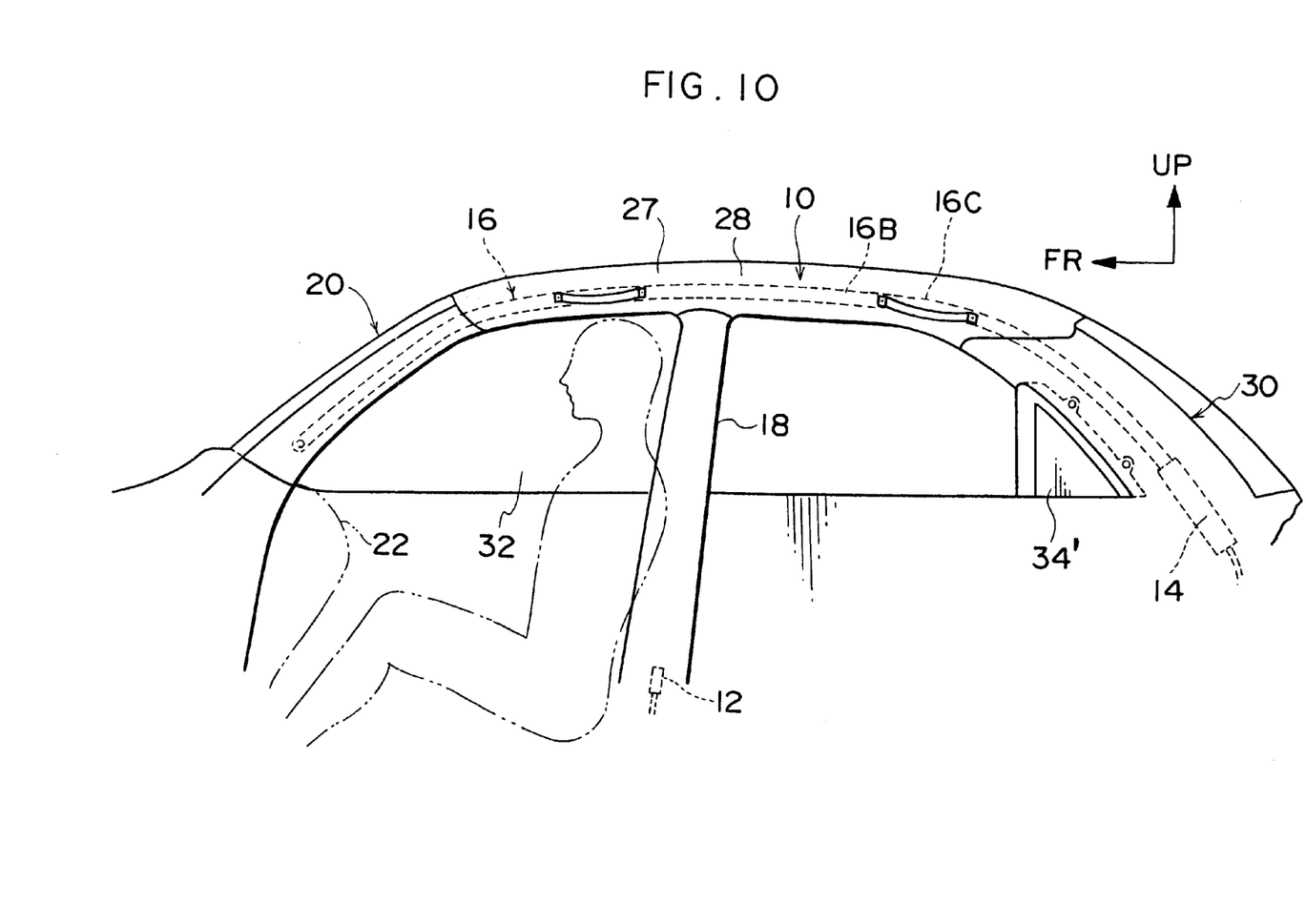
FIG. 10 is a side view similar to FIG. 4 but illustrating a triangular corner portion at the rear side of the window glass of the rear door.

Although the present invention has been described in detail as related to specific embodiments, it will be understood by those skilled in the art that the present invention is not limited to these specific embodiments thereof and other various modifications may be made within the scope of the present invention. For example, in each of the above-described embodiments, there was described the structure in which the fixed window 34 or the fixed panel plate portion 68 is formed as the triangular corner portion at the front side of the window glass 32 of the front side door. However, as shown in FIG. 10 the present invention can also be applied to the vehicle in which a fixed window or a fixed panel plate portion 34' is formed as the triangular corner portion at the rear side of the window glass of a rear side door.

What is claimed is:

1. A head-protecting air bag device for a vehicle in which an air bag body is accommodated in a folded state over a region from a pillar to a roof side rail such that the air bag body can expand similarly to a curtain upon a collision and a portion of the pillar at the interior of the vehicle is formed by a pillar garnish, comprising:

a triangular corner portion formed in at least one of the front portion of a window glass of a front side door and the rear portion of a window glass of a rear side door;

a pillar garnish main body portion which forms a portion of the pillar at the interior of the vehicle and is allowed to open during expansion of the air bag body; and a pillar garnish divided portion which is formed separately from said pillar garnish main body portion and forms a portion of said triangular corner portion at the interior of the vehicle in at least a region along an edge portion of a window glass, said pillar garnish divided portion being fixed to the pillar.

2. A head-protecting air bag device for a vehicle according to claim 1, wherein said pillar garnish divided portion includes an extending portion which extends along an upper edge of said triangular corner portion and the extending portion includes fixing portions and is fixed by the fixing portions to the pillar, the fixing portions being covered by said pillar garnish main body portion.

3. A head-protecting air bag device for a vehicle according to claim 2, wherein a guide surface for guiding an expansion of the air bag body is formed in the extending portion.

4. A head-protecting air bag device for a vehicle according to claim 3, wherein the air bag body is disposed between said pillar garnish main body portion and the guide surface so as to be expandable along the guide surface in a predetermined direction.

5. A head-protecting air bag device for a vehicle according to claim 2, wherein said pillar garnish divided portion includes a rear portion which extends downward from an uppermost end of the extending portion along an upper edge of said triangular corner portion and the rear portion forms a portion of a division bar at the interior of a vehicle by which the window glass of the side door and said triangular corner portion are separated.

6. A head-protecting air bag device for a vehicle according to claim 5, wherein the division bar includes a division bar outer panel at an exterior side in a transverse direction of a vehicle and a division bar inner panel at an interior side in the transverse direction of the vehicle, the division bar outer panel and the division bar inner panel form a closed cross sectional configuration, and the rear portion of said pillar garnish divided portion is fixed to the division bar inner panel.

7. A head-protecting air bag device for a vehicle according to claim 6, wherein the rear portion of said pillar garnish divided portion is fixed to said division bar inner panel by a hook.

8. A head-protecting air bag device for a vehicle according to claim 2, wherein the fixing portion in the extending portion of said pillar garnish divided portion is fixed to the pillar by fastening members.

9. A head-protecting air bag device for a vehicle according to claim 1, wherein a notch is formed on a back surface of said pillar garnish main body portion along a longitudinal direction of said pillar garnish main body portion, and when a high load of predetermined level acts on a side portion of a vehicle body to expand the air bag body, said pillar garnish main body portion elastically deforms due to the notch.

10. A head-protecting air bag device for a vehicle according to claim 1, wherein the pillar includes a pillar portion adjacent to said triangular corner portion and said pillar garnish main body portion includes a pillar garnish portion extending from the pillar portion adjacent to said triangular corner portion to the roof side rail, and also includes a roof side rail lining portion extending along the roof side rail.

11. A head-protecting air bag device for a vehicle according to claim 10, wherein an inflator, which operates so as to eject gas when a high load of predetermined level acts on a side portion of a vehicle body, is disposed in a side portion of a vehicle body in the vicinity of the lower end of the pillar garnish portion.

12. A head-protecting air bag device for a vehicle according to claim 11, wherein the air bag body is disposed along at least the pillar garnish portion and the roof side rail lining portion of said pillar garnish main body portion and one end portion of the air bag body is disposed at a position where the inflator is disposed so as to allow gas ejected from the inflator to flow into the air bag body.

13. A head-protecting air bag device for a vehicle according to claim 1, wherein said triangular corner portion is a fixed window.

14. A head-protecting air bag device for a vehicle according to claim 1, wherein said triangular corner portion is a fixed panel plate portion.

15. A head-protecting air bag device for a vehicle according to claim 2, wherein the pillar includes a front pillar at a front portion of a vehicle and a quarter pillar at a rear portion of the vehicle and at least one of the front pillar and the quarter pillar includes a pillar outer panel at an exterior side in a transverse direction of the vehicle and a pillar inner panel at an interior side in the transverse direction of the vehicle, the pillar outer panel and the pillar inner panel forming a closed cross sectional configuration and the fixing portion of the extending portion of said pillar garnish divided portion being fixed to the pillar inner panel.

16. A head-protecting air bag device for a vehicle according to claim 15, wherein said pillar garnish main body portion is fixed to said pillar inner panel by a hook.

17. A head-protecting air bag device for a vehicle according to claim 4, wherein the pillar includes a pillar portion adjacent to said triangular corner portion and said pillar garnish main body portion includes a pillar garnish portion extending from the pillar portion adjacent to said triangular corner portion to the roof side rail, and also includes a roof side rail lining portion extending along the roof side rail.

18. A head-protecting air bag device for a vehicle according to claim 17, wherein an inflator, which operates so as to eject gas when a high load of predetermined level acts on a side portion of a vehicle body, is disposed in a side portion of a vehicle body in the vicinity of the lower end of the pillar garnish portion.

19. A head-protecting air bag device for a vehicle according to claim 18, wherein the air bag body is disposed along at least the pillar garnish portion and the roof side rail lining portion of said pillar garnish main body portion and one end portion of the air bag body is disposed at a position where the inflator is disposed so as to allow gas ejected from the inflator to flow into the air bag body.

20. A head-protecting air bag device for a vehicle according to claim 4, wherein a notch is formed on a back surface of said pillar garnish main body portion along the longitudinal direction of said pillar garnish main body portion, and when the air bag body expands due to a high load of predetermined level acting on a side portion of a vehicle body, said pillar garnish main body portion is caused to elastically deform along the notch by the expanding air bag body.

* * * * *